(12) United States Patent
Nishimura et al.

(10) Patent No.: US 11,456,110 B2
(45) Date of Patent: Sep. 27, 2022

(54) COIL DEVICE

(71) Applicant: IHI CORPORATION, Tokyo (JP)

(72) Inventors: Kenji Nishimura, Tokyo (JP);
Motonao Niizuma, Tokyo (JP)

(73) Assignee: IHI CORPORATION, Tokyo (JP)

( * ) Notice: Subject to any disclaimer, the term of this patent is extended or adjusted under 35 U.S.C. 154(b) by 495 days.

(21) Appl. No.: 16/486,716

(22) PCT Filed: Jun. 21, 2018

(86) PCT No.: PCT/JP2018/023620
§ 371 (c)(1),
(2) Date: Aug. 16, 2019

(87) PCT Pub. No.: WO2018/235898
PCT Pub. Date: Dec. 27, 2018

(65) Prior Publication Data
US 2020/0020478 A1 Jan. 16, 2020

(30) Foreign Application Priority Data
Jun. 22, 2017 (JP) .............................. JP2017-122068

(51) Int. Cl.
*H01F 27/28* (2006.01)
*H02J 50/10* (2016.01)
*B60L 53/12* (2019.01)
*H01F 38/14* (2006.01)

(52) U.S. Cl.
CPC .......... *H01F 27/2876* (2013.01); *B60L 53/12* (2019.02); *H01F 38/14* (2013.01); *H02J 50/10* (2016.02)

(58) Field of Classification Search
CPC .... H01F 27/2876; H01F 38/14; H01F 27/025; H01F 27/22; B60L 53/12; B60L 53/302; H02J 50/10; H02J 50/12; Y02T 10/70; Y02T 10/7072; Y02T 90/12; Y02T 90/14; B60M 7/00
See application file for complete search history.

(56) References Cited

U.S. PATENT DOCUMENTS 6,049,191 A * 4/2000 Terazoe .................. B60L 53/12
320/108
2006/0060328 A1 3/2006 Ewes
(Continued)

FOREIGN PATENT DOCUMENTS

CN 102105040 A * 6/2011
CN 102105040 A 6/2011
(Continued)

*Primary Examiner* — Pinping Sun
(74) *Attorney, Agent, or Firm* — Volpe Koenig

(57) ABSTRACT

A coil device includes a coil unit for stowing a coil part, and a heat dissipation unit thermally connected to the coil unit. The heat dissipation unit has a heat dissipation body, a heat dissipation fin movable relative to the heat dissipation body, and a fin drive mechanism for driving the heat dissipation fin. The heat dissipation unit has a heat dissipation configuration in which the heat dissipation fin projects from the heat dissipation body in a direction intersecting a winding axis, and a stowed configuration in which the heat dissipation fin is stowed in the heat dissipation body.

11 Claims, 13 Drawing Sheets

(56) References Cited

U.S. PATENT DOCUMENTS

| | | | |
|---|---|---|---|
| 2006/0078151 A1* | 4/2006 | Kemmerer | H04R 9/022 381/396 |
| 2012/0033381 A1 | 2/2012 | Matsumoto et al. | |
| 2012/0314365 A1 | 12/2012 | Matsumoto et al. | |
| 2013/0181667 A1 | 7/2013 | Takeshita | |
| 2014/0002228 A1 | 1/2014 | Hatanaka et al. | |
| 2015/0327405 A1 | 11/2015 | Niizuma | |
| 2016/0217899 A1 | 7/2016 | Miyauchi et al. | |
| 2016/0381829 A1* | 12/2016 | Niizuma | B60L 53/124 361/699 |
| 2017/0103850 A1 | 4/2017 | Furiya | |
| 2017/0129345 A1* | 5/2017 | Wechsler | H02J 7/0042 |
| 2018/0072182 A1* | 3/2018 | Araki | B60L 53/66 |
| 2019/0221353 A1* | 7/2019 | Hwang | C09D 163/00 |
| 2019/0241083 A1 | 8/2019 | Wechsler et al. | |
| 2019/0241084 A1 | 8/2019 | Wechsler et al. | |

FOREIGN PATENT DOCUMENTS

| | | |
|---|---|---|
| CN | 102415229 A | 4/2012 |
| CN | 102763496 A | 10/2012 |
| CN | 103443884 A | 12/2013 |
| CN | 203761096 U | 8/2014 |
| CN | 204732923 U | 10/2015 |
| CN | 105826035 A | 8/2016 |
| CN | 106233573 A | 12/2016 |
| EP | 3306628 A1 | 4/2018 |
| JP | H6-077363 A | 3/1994 |
| JP | 08-195315 A | 7/1996 |
| JP | 2006-093700 A | 4/2006 |
| JP | 2010-258437 A | 11/2010 |
| JP | 2012-099644 A | 5/2012 |
| JP | 2012-228123 A | 11/2012 |
| JP | 2014-171381 A | 9/2014 |
| JP | 2016-103645 A | 6/2016 |
| JP | 2016-127078 A | 7/2016 |
| KR | 100792309 B1 | 1/2008 |
| WO | 2012/039077 A1 | 3/2012 |
| WO | 2015/128498 A1 | 9/2015 |
| WO | 2016/194739 A1 | 12/2016 |

\* cited by examiner (a)

(b)

(a)

(b)

(a)

(b)

(a)

(b)

(a)

(b)

(a)

(b)

(a)

(b)

(a)

(b)

COIL DEVICE

TECHNICAL FIELD

The present disclosure relates to a coil device.

BACKGROUND ART

Patent Literatures 1 and 2 disclose techniques that focus on heat generated by a coil in a wireless power transfer device. The wireless power transfer device of Patent Literature 1 has a liquid type cooling mechanism. Specifically, the wireless power transfer device of Patent Literature 1 includes a flow path through which a fluid circulates. The heat generated by the coil is absorbed by a liquid that flows through the flow path. The wireless power transfer device of Patent Literature 2 thermally protects electronic components by utilizing a partition wall that has thermal insulation properties. The wireless power transfer device of Patent Literature 2 externally releases joule heat that is generated by a power transmission coil utilizing a member which has a high thermal conductivity.

CITATION LIST

Patent Literature

Patent Literature 1: Japanese Unexamined Patent Publication No. 2012-228123

Patent Literature 2: Japanese Unexamined Patent Publication No. 2016-103645

SUMMARY OF INVENTION

Technical Problem

In the field relating to wireless power transfer devices, it is desired that the heat generated by a coil during conduction is efficiently released. The wireless power transfer device of Patent Literature 1 efficiently releases the heat generated by the coil by the liquid type cooling mechanism. However, the liquid type cooling mechanism requires a flow path to be formed inside the coil device. Moreover, the liquid type cooling mechanism requires accessory devices such as a pump for circulating the liquid. Thus, this may prevent downsizing of the wireless power transfer device.

The present disclosure describes a coil device which enables both efficient heat dissipation and downsizing.

Solution to Problem

One embodiment of the present disclosure is a coil device. The coil device includes a coil unit for stowing a coil part and having a main surface, and a heat dissipation unit thermally connected to the coil unit. The heat dissipation unit includes a heat dissipation body thermally connected to the main surface, a heat dissipation member movable relative to the heat dissipation body and thermally connected to the heat dissipation body, and a drive part for driving the heat dissipation member. The heat dissipation unit has a first configuration in which the heat dissipation member projects from the heat dissipation body in a direction along the main surface, and a second configuration in which the heat dissipation member is stowed in the heat dissipation body.

Effects of Invention

The coil device according to the present disclosure enables both efficient heat dissipation and downsizing.

DESCRIPTION OF EMBODIMENTS

Figure 1:
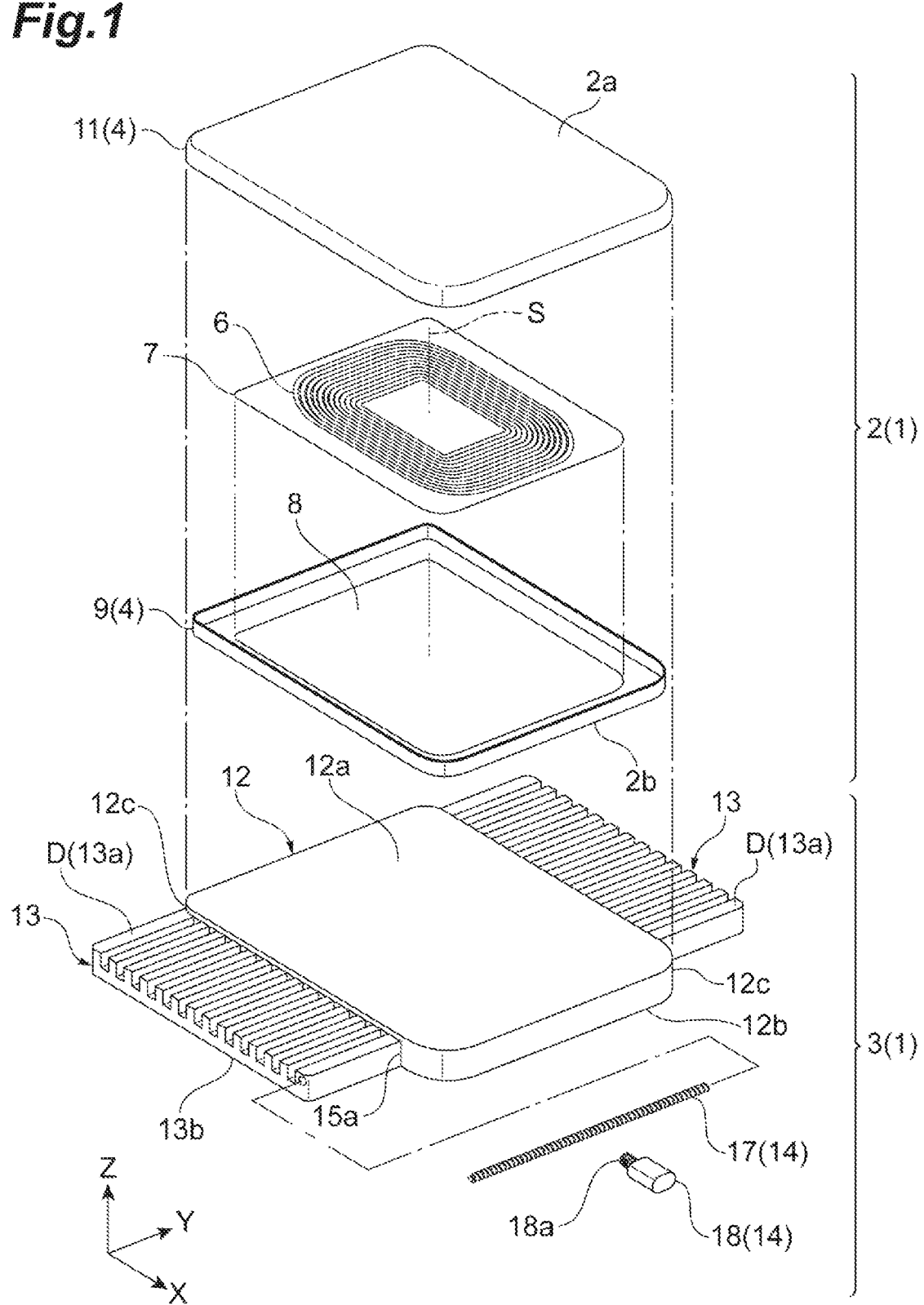
FIG. 1 is an exploded perspective view showing a coil device.

One embodiment of the present disclosure is a coil device. The coil device includes a coil unit for stowing a coil part and having a main surface, and a heat dissipation unit thermally connected to the coil unit. The heat dissipation unit includes a heat dissipation body thermally connected to the main surface, a heat dissipation member movable relative to the heat dissipation body and thermally connected to the heat dissipation body, and a drive part for driving the heat dissipation member. The heat dissipation unit has a first configuration in which the heat dissipation member projects from the heat dissipation body in a direction along the main surface, and a second configuration in which the heat dissipation member is stowed in the heat dissipation body.

In the coil device, the heat dissipation body of the heat dissipation unit is thermally connected to the coil unit. The heat dissipation member is thermally connected to the heat dissipation body. Heat generated by the coil part that is housed in the coil unit is thus transferred to the heat dissipation member via the heat dissipation body. The heat dissipation member projects from the heat dissipation body in a direction along the main surface of the coil unit. A heat dissipation area that contributes to heat dissipation is thus increased. As a result, the amount of heat dissipated by heat radiation and heat transfer to the air is increased. The coil device is thus capable of efficiently dissipating heat. The heat dissipation member is stowed in the heat dissipation body. The coil device can thus be downsized. That is, since the coil device has the heat dissipation member that can be inserted into and removed from the heat dissipation body, the coil device enables both efficient heat dissipation and downsizing.

When the coil part is being supplied with an electric current, the heat dissipation unit may be in the first configuration. When the coil part is being supplied with an electric current, the coil part generates heat. When the coil part is generating heat, the heat dissipation unit is in the first configuration in which the heat dissipation member is projected. The increased heat dissipation area thus enables the heat generated by the coil part to be efficiently dissipated. As a result, the influence of the heat on the coil unit is reduced so that the coil device can be stably operated.

When the heat dissipation unit is in the first configuration, a length of the heat dissipation member projecting from the heat dissipation body may be a predetermined desired projection length. This configuration enables to achieve a heat dissipation configuration that corresponds to the mode of heat generation.

The coil device supplies power to a paired coil device or receives power from the paired coil device, and when the heat dissipation unit is in the first configuration, the length of the heat dissipation member projecting from the heat dissipation body may be determined based on an amount of misalignment between the coil part of the coil device and the coil part of the paired coil device. When the coil device and the paired coil device are misaligned, the coil parts are misaligned. The misalignment between the coil parts causes flux leakage. The flux leakage causes the coil parts to generate heat corresponding to the amount of misalignment. The length of the heat dissipation member projecting from the heat dissipation body is determined on the basis of the misalignment between the coil parts. The projection length of the heat dissipation member can thus be a length corresponding to the rise in temperature. As a result, the power required to drive the coil device can be reduced.

The coil device according to the present disclosure is described in detail below with reference to the accompanying drawings. Like elements are given like reference signs in the description of the drawings and redundant explanation is omitted. Additionally, an orthogonal coordinate system shown in the diagrams may be used for the description of the drawings. In the description below, "front" corresponds to a positive X direction. "Back" corresponds to a negative X direction. "Left" corresponds to a positive Y direction. "Right" corresponds to a negative Y direction. "Up" corresponds to a positive Z direction. "Down" corresponds to a negative Z direction.

The coil device is used in a wireless power transfer system. As shown in FIG. 1, a coil device 1 includes a coil unit 2 and a heat dissipation unit 3.

The coil unit 2 is a rectangular parallelepiped having a rectangular shape in plan view. The coil unit 2 has a power transmission surface 2a and a base connection surface 2b (main surface). The power transmission surface 2a faces another coil device 1. The base connection surface 2b is fixed to the heat dissipation unit 3. In the coil device 1, the heat dissipation unit 3 and the coil unit 2 are stacked in this order along a vertically upward direction (Z axis direction). In other words, the coil unit 2 is placed on top of the heat dissipation unit 3. The coil unit 2 includes a housing 4, a coil 6 (coil part), a coil holding plate 7, and a ferrite plate 8.

The housing 4 has substantially the same shape as the heat dissipation unit 3 in plan view. The housing 4 forms a space that houses the coil 6, the coil holding plate 7, and the ferrite plate 8. The housing 4 has a case body 9 and a lid 11.

The coil 6 is formed by a conductive wire that is wound in a substantially rectangular spiral within the same plane. The coil 6 generates an induced current. The coil 6 is a so-called circular coil. A circular coil is a type of coil in which a conductive wire is wound in a flat spiral around a winding axis S. A flat spiral is the shape of the conductive wire wound around the winding axis S from the outside to the inside or from the inside to the outside so as to surround the same. It is only required that the coil 6 has a configuration in which the conductive wire is wound in a flat spiral. The coil 6 thus may be a single-layer coil or a multi-layer coil. Additionally, there may be a plurality of the winding axes S and spirals within the same plane. The coil 6 viewed from a direction of the winding axis S may be of various shapes, such as rectangular, circular, or oval. A litz wire in which a plurality of conductor strands insulated from each other are twisted together may, for example, be used as the conductive wire. The conductive wire may be a copper or aluminum solid wire, a bus bar, or the like. It should be noted that the coil may be a solenoid coil.

The coil holding plate 7 is a planar member for holding the coil 6. The coil holding plate 7 is a so-called bobbin. The coil holding plate 7 has, for example, grooves into which the coil 6 is fit. A material having electrical insulating properties (e.g., silicone or polyphenylene sulfide resin) is used as the material for the coil holding plate 7. The grooves into which the coil 6 is fit may be formed on the lid 11. Additionally, the coil 6 may be hardened by an adhesive material and/or varnish. In this case, the coil holding plate 7 may be omitted.

The ferrite plate 8 is, for example, a rectangular planar ferrite core. The ferrite plate 8 is magnetic and controls the direction of magnetic lines of force generated by the coil 6. The ferrite plate 8 also converges the magnetic lines of force. The ferrite 8 may have a shape and size, for example, that are substantially equal to the shape and size of the coil holding plate 7 in plan view. The shape and size of the ferrite plate 8 are not limited to a square. The ferrite plate 8 may be set to any shape and size that can be stowed in the housing 4.

The heat dissipation unit 3 is thermally connected to the coil unit 2 on a lower side of the coil unit 2. The heat dissipation unit 3 is disposed so as to contact a road surface or the like. The heat dissipation unit 3 is nonmagnetic and is electrically conductive. The heat dissipation unit 3 is formed from a material that has high rigidity (e.g., aluminum or copper). The heat dissipation unit 3 ensures the rigidity of the coil device 1 as a whole. The heat dissipation unit 3 blocks external outflow of the flux leakage. The heat dissipation unit 3 dissipates the heat generated in the coil unit 2. In other words, the heat dissipation unit 3 functions as a so-called heat sink.

Figure 2:
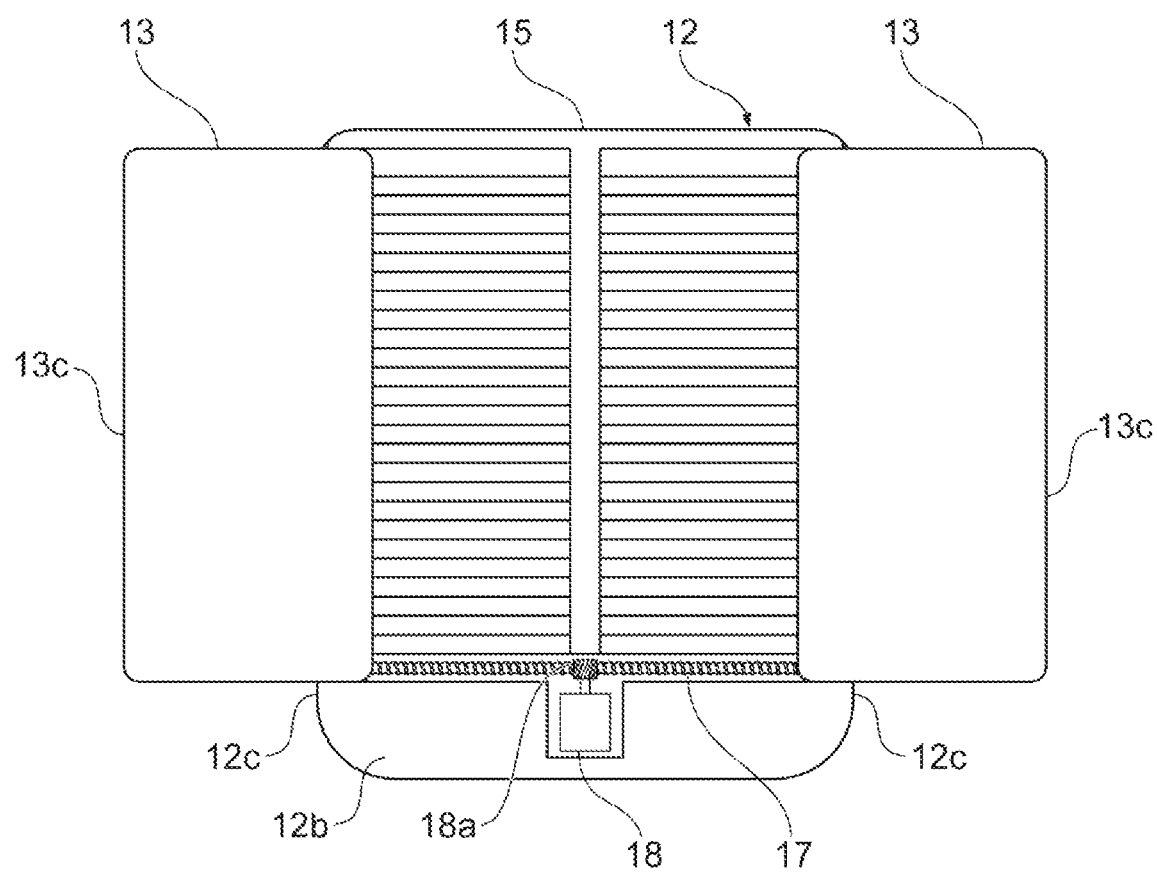
FIG. 2 is a plan view of a heat dissipation unit of the coil device.

As shown in FIGS. 1 and 2, the heat dissipation unit 3 includes a heat dissipation body 12, a pair of heat dissipation fins 13 (heat dissipation members), and a fin drive mechanism 14 (drive part). The heat dissipation body 12 includes a housing connection surface 12a (first mounting surface), a road surface connection surface 12b (second mounting surface), and fin side surfaces 12c. The heat dissipation body 12 has a fin housing part 15 (see FIG. 2). The housing connection surface 12a is the top surface when disposed on a road surface. The housing connection surface 12a faces the base connection surface 2b of the coil unit 2. The road surface connection surface 12b is the bottom surface when disposed on the road surface. The road surface connection surface 12b faces the road surface. The fin side surfaces 12c connect the housing connection surface 12a to the road surface connection surface 12b. The fin housing part 15 is a recess formed in the road surface connection surface 12b. The fin housing part 15 has fin openings 15a formed on the fin side surfaces 12c. The shape of the fin openings 15a conforms to the external shape of the heat dissipation fins 13.

The heat dissipation fins 13 are movable relative to the heat dissipation body 12. The heat dissipation fins 13 each includes a heat dissipation surface 13a and a movable surface 13b. The heat dissipation surface 13a has a plurality of protrusions D. Each of the plurality of protrusions D extend in a Y-axis direction. The plurality of protrusions D are separated from each other in an X-axis direction. Such shape increases the surface area of the heat dissipation surface 13a. Heat is dissipated efficiently as a result. The heat dissipation surface 13a is formed slidable relative to the heat dissipation body 12. The heat dissipation surface 13a is in constant contact with the fin housing part 15 of the heat dissipation body 12. This contact includes direct contact between the heat dissipation surface 13a and the fin housing part 15, and indirect contact between the heat dissipation surface 13a and the fin housing part 15 with a member such as grease therebetween. For example, a small gap is formed between the heat dissipation surface 13a and the fin housing part 15. For example, a thermally conductive silicone and/or oil that do not naturally volatilize may be disposed in this gap. A thermally conductive silicone sheet having abrasion resistance may be inserted in the gap. Such configuration enables the heat dissipation fins 13 to be inserted into and removed from the heat dissipation body 12 smoothly and the heat to be conducted efficiently from the heat dissipation body 12 to the heat dissipation fins 13.

The movable surface 13b is formed on a lower side of the heat dissipation surface 13a. The movable surface 13b faces the road surface. The movable surface 13b is not fixed to the road surface. The movable surface 13b is thus movable relative to the road surface. For example, the movable surface 13b is formed slightly above the road surface connection surface 12b of the heat dissipation body 12. That is, a gap may be formed between the movable surface 13b and a road surface G (see FIG. 4).

The fin drive mechanism 14 reciprocates the pair of heat dissipation fins 13 in the Y-axis direction. The fin drive mechanism 14 includes a worm gear 17 and an electric motor 18. The worm gear 17 is a component having helical teeth on a rod that extends in the Y-axis direction. One end of the worm gear 17 is screwed into one of the heat dissipation fins 13. The other end of the worm gear 17 is screwed into the other heat dissipation fin 13. The electric motor 18 has a gear 18a that meshes with the teeth of the worm gear 17. The electric motor 18 applies torque to the worm gear 17 through the gear 18a. The electric motor 18 is capable of forward and reverse rotations. The electric motor 18 rotates the worm gear 17 a predetermined number of turns. By setting the number of turns of the worm gear 17 to a predetermined number, the projection lengths of the heat dissipation fins 13 can be controlled to a desired length. A desired projection length is, for example, a length required for the temperature of a predetermined portion of a power transmission coil device 24 to be lower than a threshold. A desired projection length is also, for example, a length required to limit the rise in temperature of a predetermined portion of the power transmission coil device 24. By setting the projection length to a minimally required length to lower the temperature below the threshold and/or to limit the rise in temperature, energy consumption of the electric motor 18 can be reduced. It can also reduce the possibility of a vehicle V riding over the heat dissipation fins 13.

The fin drive mechanism 14 shown in FIG. 1 drives the pair of the heat dissipation fins 13 by the one worm gear 17. This configuration causes the projection lengths of the pair of the heat dissipation fins 13 to be always the same. However, the length of one of the heat dissipation fins 13 may be different from the projection length of the other heat dissipation fin 13. For example, one of the heat dissipation fins 13 may be stowed in the heat dissipation body 12 with only the other heat dissipation fin 13 being projected. To do so, the fin drive mechanism 14 is provided for each of the one of the heat dissipation fins 13 and the other heat dissipation fin 13. It is only required that there is a fin drive mechanism to drive one of the heat dissipation fins 13 and a fin drive mechanism to drive the other heat dissipation fin 13.

Figure 3:
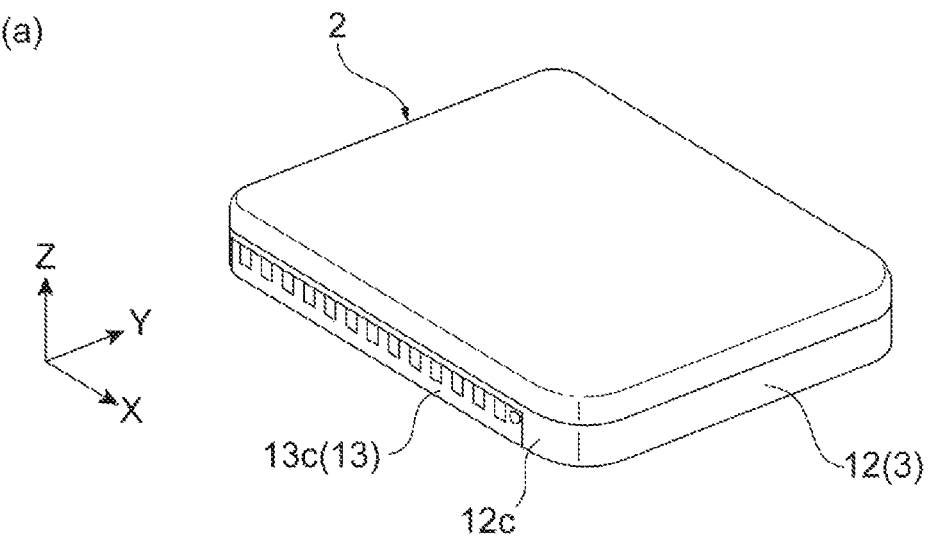
FIG. 3(*a*) is a perspective view showing a stowed configuration and FIG. 3(*b*) is a perspective view showing a heat dissipation configuration.
Figure 3:
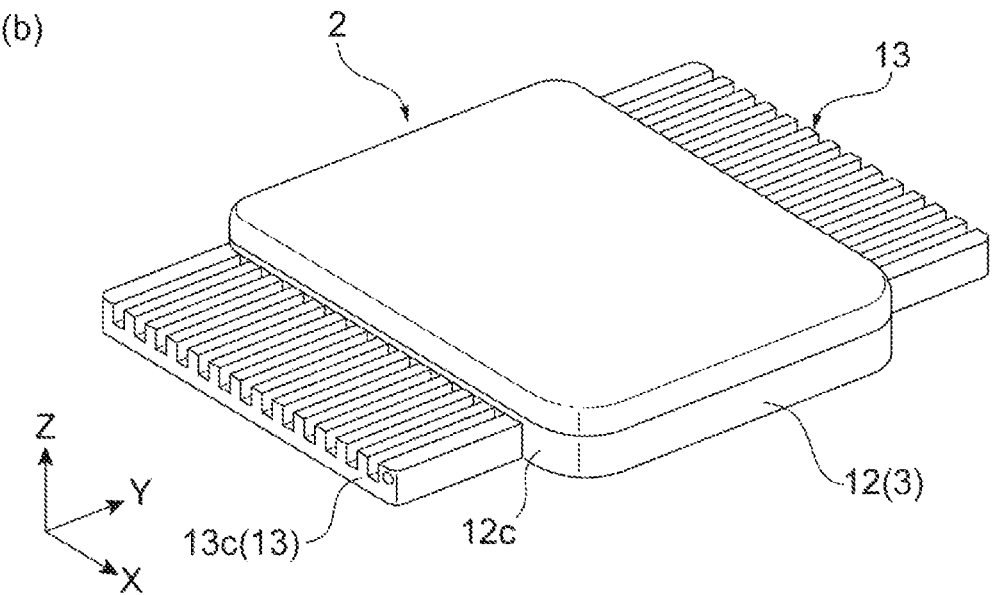

As shown in FIGS. 3(a) and 3(b), the heat dissipation unit 3 has two or more different configurations. FIG. 3(a) shows a configuration in which the heat dissipation fins 13 are stowed in the heat dissipation body 12 (stowed configuration, second configuration). FIG. 3(b) shows a configuration in which the heat dissipation fins 13 project from the heat dissipation body 12 (heat dissipation configuration, first configuration).

In the coil device 1, the heat dissipation body 12 of the heat dissipation unit 3 is thermally connected to the coil unit 2. The heat dissipation body 12 is thermally connected to the heat dissipation fins 13. The heat generated by the coil 6 that is housed in the coil unit 2 is thus transferred to the heat dissipation fins 13 via the heat dissipation body 12. The heat dissipation fins 13 project from the heat dissipation body 12 in a direction (Y-axis direction) intersecting the winding axis S (see FIG. 1). The heat dissipation area that contributes to heat dissipation is thus increased. Heat is dissipated efficiently as a result. In addition, the heat dissipation fins 13 are stowed in the heat dissipation body 12. The coil device 1 can thus be downsized. Consequently, due to the heat dissipation fins 13 that can be inserted into and removed from the heat dissipation body 12, the coil device 1 enables both efficient heat dissipation and downsizing.

An operation set to the stowed configuration and an operation set to the heat dissipation configuration may correspond to a power feeding operation to another coil device 1. For example, when no power is fed, no electric current is supplied to the coil 6. Since the coil 6 does not generate heat, it is not necessary to actively dissipate heat. The heat dissipation fins 13 are thus stowed in the heat dissipation body 12 (stowed configuration). The stowed configuration enables the coil device 1 to be downsized. On the other hand, when power is fed, an electric current is supplied to the coil 6. Since the coil 6 generates heat, the heat is actively dissipated. The heat dissipation fins 13 are thus caused to project from the heat dissipation body 12 (heat dissipation configuration). The heat dissipation configuration enlarges the heat dissipation area that contributes to heat dissipation. Heat dissipation efficiency is improved as a result.

Figure 4:
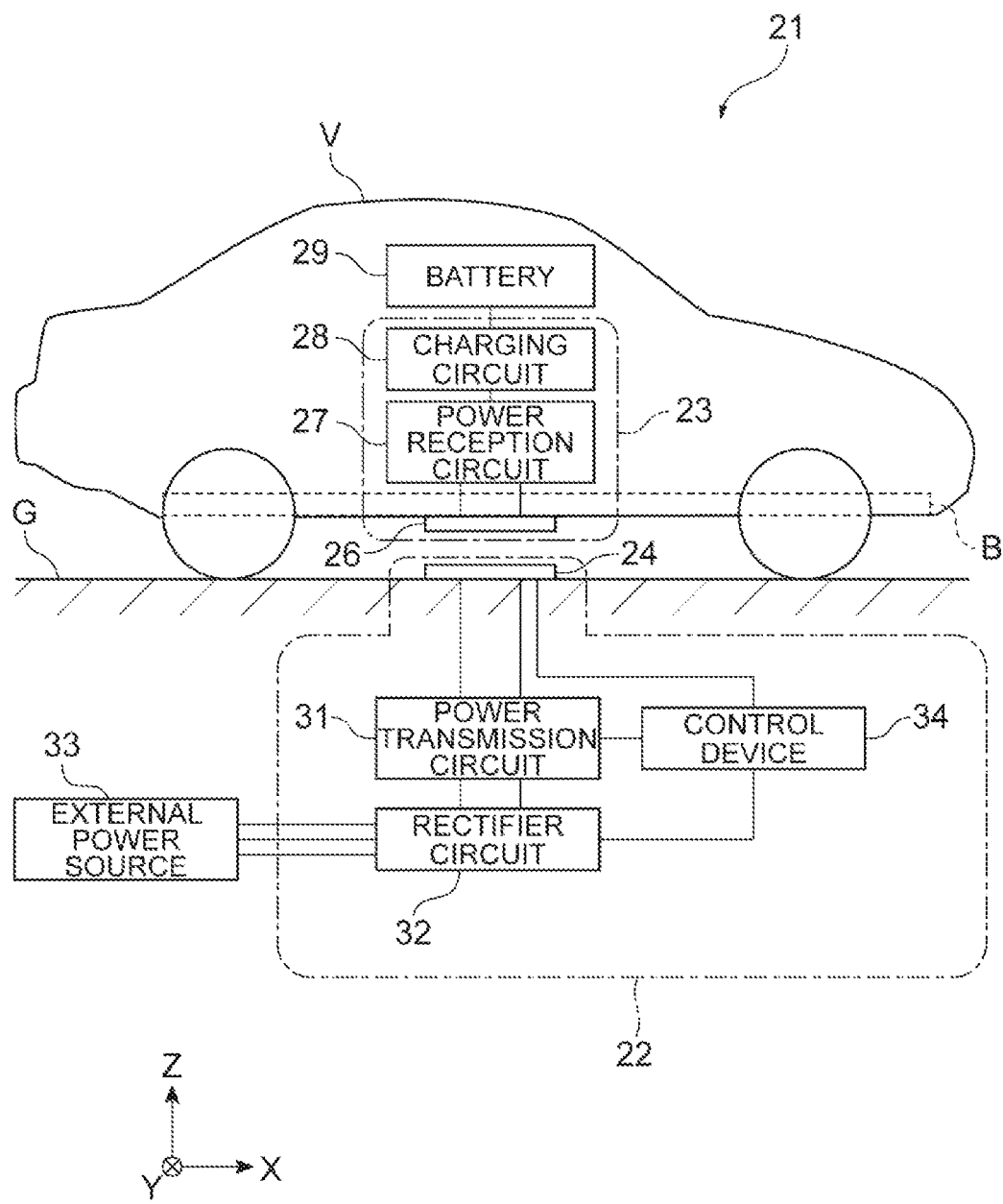
FIG. 4 is a diagram showing a configuration of a wireless power transfer system having coil devices.

A wireless power transfer system including the coil device 1 according to the embodiment will now be explained. As shown in FIG. 4, a wireless power transfer system 21 charges a battery 29 that is mounted on the vehicle V, such as an electric vehicle or a hybrid vehicle. The wireless power transfer system 21 supplies power directly to a drive source, such as an electric motor. The vehicle V includes components necessary for travel such as an electric motor, a steering wheel, and brakes. However, these components are omitted in FIG. 4.

The wireless power transfer system 21 includes a power transmitter 22 installed on the road surface G and a power receiver 23 mounted on the vehicle V. The power transmitter 22 and the power receiver 23 each has the coil device 1 according to the embodiment. Hereinafter, the coil device 1 of the power transmitter 22 is referred to as the power transmission coil device 24, and the coil device 1 of the power receiver 23 as the power reception coil device 26 (paired coil device). When the power transmission coil device 24 and the power reception coil device 26 are in close proximity, the coil 6 (see FIG. 1) of the power transmission coil device 24 and the coil 6 of the power reception coil device 26 (paired coil part) are in close proximity to one another. In this proximal state, an electromagnetic coupling circuit is formed by the pair of the coils 6. The electromagnetic coupling circuit wirelessly transfers power from the coil 6 on a power transmitting side to the coil 6 on a power receiving side by electromagnetic coupling of the coils 6. The electromagnetic coupling circuit may be an electromagnetic induction coupling circuit or a magnetic resonance coupling circuit.

The power transmission coil device 24 and the power reception coil device 26 face each other in an up-down direction and are spaced apart by a predetermined distance. The power transmission coil device 24 protrudes upward from the road surface G. The power reception coil device 26 is attached, for example, to a lower surface of a chassis B of the vehicle V.

The power receiver 23 includes the power reception coil device 26 (coil device), a power reception circuit 27, and a charging circuit 28. The power reception coil device 26 receives power (AC power) wirelessly supplied from the power transmission coil device 24 of the power transmitting side. The power reception circuit 27 converts the AC power from the power reception coil device 26 into DC power. The power reception circuit 27 then outputs the DC power to the charging circuit 28. The charging circuit 28 converts the power (DC power) from the power reception circuit 27 into a desired power. The charging circuit 28 supplies the desired power to the battery 29. The battery 29 is a rechargeable battery mounted on the vehicle V. The battery 29 is, for example, a secondary battery such as a lithium ion battery or a nickel hydrogen battery. The battery 29 supplies power to a travel motor and the like not shown.

The power transmitter 22 includes the power transmission coil device 24 (coil device), a power transmission circuit 31, a rectifier circuit 32, and a control device 34.

The power transmission coil device 24 is installed on the road surface G.

The power transmission circuit 31 converts the power supplied from the rectifier circuit 32 into AC power (high frequency power). The power transmission circuit 31 provides the AC power to the power transmission coil device 24.

The rectifier circuit 32 rectifies the AC power supplied from an external power source 33. In other words, the rectifier circuit 32 converts the AC power into DC power. The rectifier circuit 32 may be omitted when the external power source 33 is a DC power source.

The external power source 33 supplies power required to generate power to be transmitted to the vehicle V.

The control device 34, which is an electronic control unit includes, for example, a central processing unit (CPU), a read only memory (ROM), and a random access memory (RAM). The control device 34 controls the circuits (the rectifier circuit 32, the power transmission circuit 31, and the like) of the power transmitter 22.

The control device 34 controls a heat dissipation operation of the power transmission coil device 24. Specifically, the control device 34 provides a control signal to the electric motor 18 (see FIG. 1). The control signal relates to the projection lengths of the heat dissipation fins 13. The projection lengths of the heat dissipation fins 13 relate to the number of rotations of the electric motor 18. The control device 34 thus rotates the electric motor 18 the number of times that corresponds to the projection lengths.

The control device 34 controls the heat dissipation fins 13 such that the heat dissipation fins 13 are in the stowed configuration (see FIG. 3(a)) when no electric current is supplied to the power transmission coil device 24. When in the stowed configuration, outer end surfaces 13c of the heat dissipation fins 13 may be flush with the fin side surfaces 12c. It should be noted that the outer end surfaces 13c may be arranged inward of the fin side surfaces 12c. The outer end surfaces 13c may protrude slightly from the fin side surfaces 12c.

The control device 34 controls the heat dissipation fins 13 such that the heat dissipation fins 13 are in the heat dissipation configuration (see FIG. 3(b)) when an electric current is supplied to the power transmission coil device 24. The heat dissipation configuration refers to the configuration in which the heat dissipation fins 13 project predetermined lengths from the fin side surfaces 12c. The predetermined lengths may be the lengths of the heat dissipation fins 13 when the heat dissipation fins 13 are mechanistically in the most projected positions. The predetermined lengths may be determined using various variables relating to the wireless power transfer system 21. For example, the predetermined lengths may be determined on the basis of the amount of misalignment between the power transmission coil device 24 and the power reception coil device 26. They may also be determined on the basis of the amount of misalignment between the coil 6 of the power transmission coil device 24 and the coil 6 of the power reception coil device 26.

Misalignment may be described by transmission efficiency between the power transmission coil device 24 and the power reception coil device 26. For example, when there is no misalignment, it can be described that they are in a positional relationship that achieves the maximum transmission efficiency. No misalignment may also be described as a state in which the center of a surface in a front-back direction (X-axis direction) of one of the coils 6 is coincident in the up-down direction (Z-axis direction) with the center of a surface in the front-back direction of the other coil 6. No misalignment may also be described as a positional relationship defined as there being no misalignment, for example, in a specification or a user manual of a wireless power transfer system in which the power transmission coil device 24 is used. Misalignment may be defined as the difference between the actual positions and these reference positions that indicate that there is no misalignment.

Figure 5:
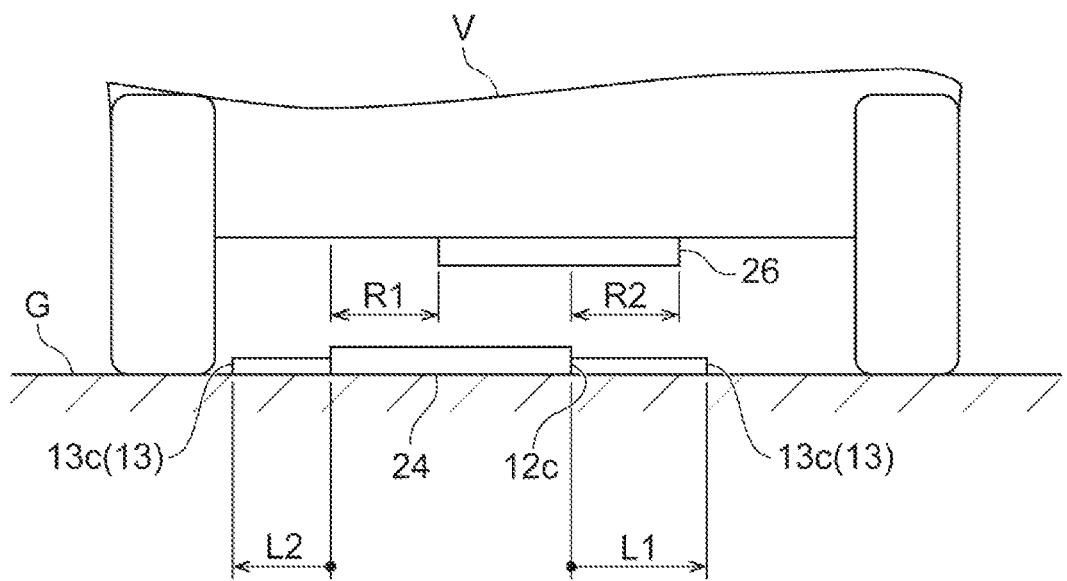
FIG. 5 is a diagram showing a misalignment between the coil devices.
Figure 5:
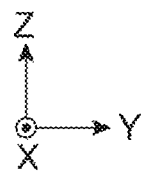

Assume as shown in FIG. 5 that the power reception coil device 26 is misaligned with the power transmission coil device 24 in a horizontal direction (Y-axis direction). In this configuration, assume that the heat dissipation fins 13 are composed of a soft magnetic material (e.g., soft ferrite).

When viewed from a vertical direction (Z-axis direction), there are regions R1, R2 where the power transmission coil device 24 does not overlap with the power reception coil device 26. These regions R1, R2 may cause flux leakage between the power transmission coil device 24 and the power reception coil device 26. When flux leakage occurs, a desired transmission efficiency may not be obtained. The control device 34 thus controls projection lengths L1, L2 of the heat dissipation fins 13 to eliminate the non-overlapping regions R1, R2. The projection lengths L1, L2 are the lengths from the fin side surfaces 12c of the heat dissipation body 12 to the outer end surfaces 13c of the heat dissipation fins 13. The control device 34 causes the projection length L1 of the other heat dissipation fin 13 to be longer than the projection length L2 of the one heat dissipation fin 13. Such configuration enables flux leakage to be reduced. Decrease in the transmission efficiency is prevented as a result.

When the power transmission coil device 24 also has a heat dissipation unit, similar control may be implemented. Flux leakage can be further reduced in this case. Decrease in the transmission efficiency is further prevented as a result.

A switching operation between the stowed configuration and the heat dissipation configuration of the heat dissipation fins 13 need not be strictly synchronous with an electric current supply operation to the coil 6. Synchronous, here, means that when supply of the electric current to the coil 6 starts, an operation of causing the heat dissipation fins 13 to project starts at the same time, and the heat dissipation configuration is maintained while the supply of the electric current to the coil 6 continues, and when the supply of the electric current to the coil 6 stops, transition from the heat dissipation configuration to the stowed configuration starts at the same time, and the stowed configuration is maintained while the supply of the electric current to the coil 6 is stopped. Employing control to immediately transition from the heat dissipation configuration to the stowed configuration when the supply of the electric current to the coil 6 stops, prevents a charged vehicle V from riding over the heat dissipation fins 13 when the vehicle V moves from its position above the power transmission coil device 24.

It is only required that the power transmission coil device 24 is in the heat dissipation configuration at least while the supply of the electric current to the coil 6 continues. Thus, when the supply of the electric current to the coil 6 stops, transition from the heat dissipation configuration to the stowed configuration need not take place immediately. For example, the transition from the heat dissipation configuration to the stowed configuration may take place when a predetermined time has passed after the supply of the electric current to the coil 6 is stopped. The timing of the transition may be, for example, when the temperature at a predetermined location of the power transmission coil device 24 falls below a threshold. Such control enables the heat dissipation fins 13 to remain projected when a charged vehicle V moves and another vehicle V moves into place above the power transmission coil device 24 immediately thereafter. The heat dissipation operation can thus be continued. Power for driving the heat dissipation fins 13 can also be reduced. Furthermore, the time for moving the heat dissipation fins 13 in and out is eliminated. Use efficiency of the wireless power transfer system 21 can be improved as a result.

The coil device of the present disclosure has been described in detail above based on the embodiment thereof. However, the coil device of the present disclosure is not limited to the embodiment above. Many variations of the coil device of the present disclosure are possible without departing from the spirit of the disclosure.

Figure 6:
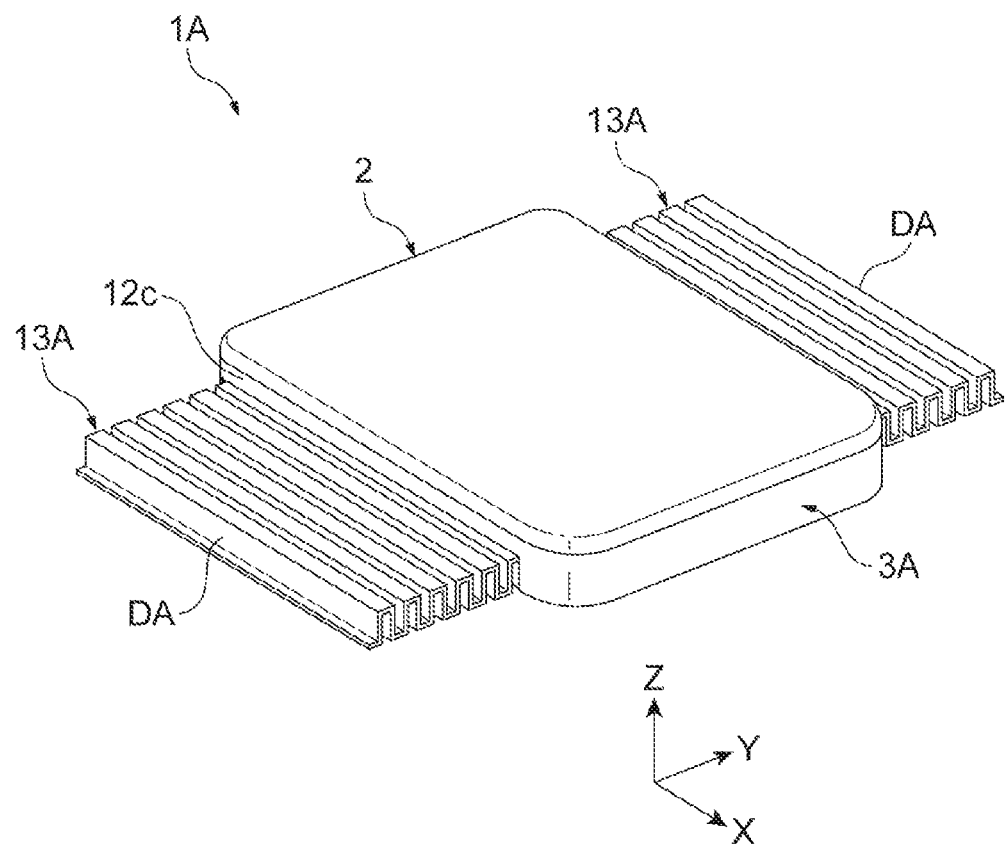
FIG. 6 is a diagram showing a variation of the coil device.
Figure 7:
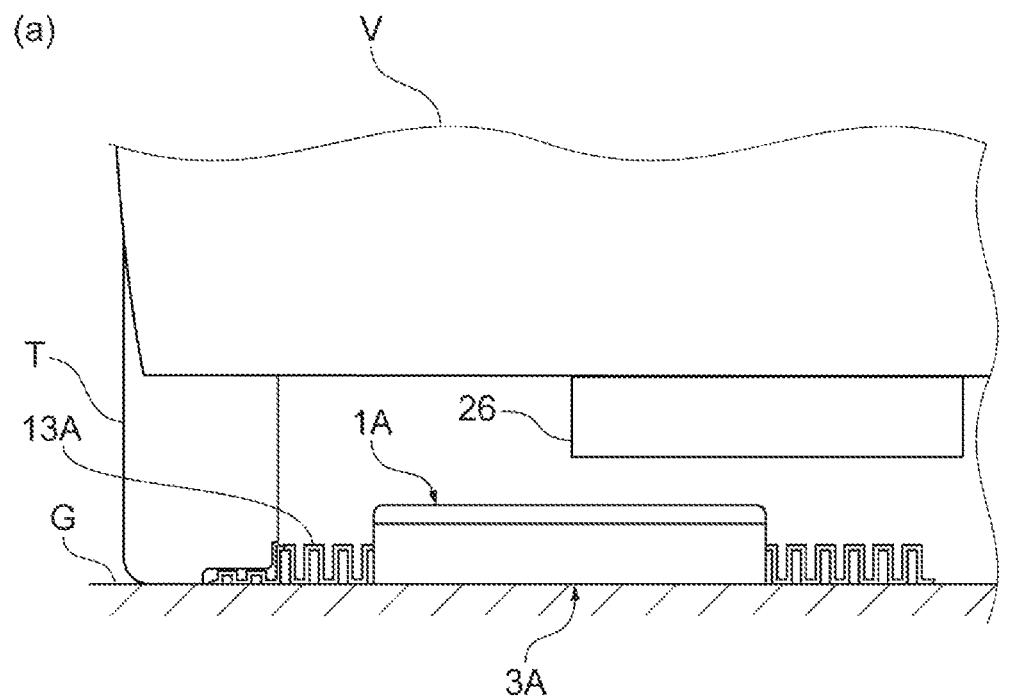
FIG. 7(*a*) is a diagram showing the coil device of FIG. 6 in use, and FIG. 7(*b*) is a diagram showing the coil device of FIG. 6 in an alternative use.
Figure 7:
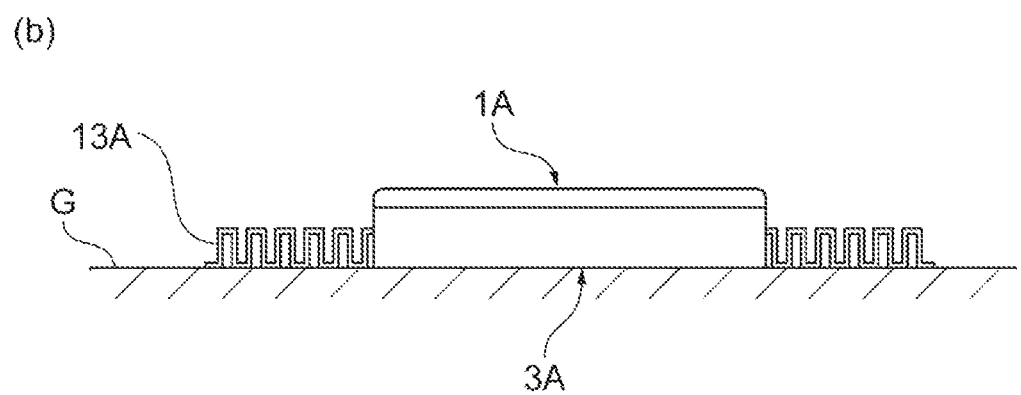
Figure 7:
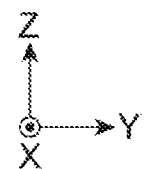

Heat dissipation members are not limited to a metal material and need only be of a material having good thermal conductivity. A material further having flexibility and shape memory characteristics in addition to good thermal conductivity may also be used as the material for forming the heat dissipation members. Such material includes shape memory alloy, silicone, and the like. As shown in FIG. 6, a coil device 1A includes a coil unit 2, and a heat dissipation unit 3A. The heat dissipation unit 3A has heat dissipation fins 13A (heat dissipation members). The heat dissipation fins 13A have protrusions DA that extend in parallel relative to fin side surfaces 12c. The plurality of the protrusions DA are formed spaced apart from each other in a drive direction (Y-axis direction). The heat dissipation fins 13A employing such material deform when run over by a tire T, as shown in FIG. 7(a), so that the effect on a vehicle V to which the tire T belongs can be reduced. The vehicle V is thus not damaged. As shown in FIG. 7(b), the heat dissipation fins 13A recover a predetermined shape after a predetermined period of time has passed.

The heat dissipation members are not limited to those having a predetermined shape as long as they have a predetermined rigidity. For example, as shown in FIGS. 8(a) and 8(b), a coil device 1B includes a coil unit 2 and a heat dissipation unit 3B. The heat dissipation unit 3B has heat dissipation sheets 37 (heat dissipation members). The heat dissipation sheets 37 may be formed from a flexible material such as a sheet member. The heat dissipation sheets 37 formed from such material have a folded shape for being stowed (stowed configuration, see FIG. 8(a)), and a spread-out shape for dissipating heat (heat dissipation configuration, see FIG. 8(b)).

The heat dissipation unit 3B shown in FIGS. 9(a) and 9(b) includes the heat dissipation sheets 37, supports 38, guide bars 39, racks 41, and electric motors 42. The supports 38 are attached to distal edges of the heat dissipation sheets 37. Distal ends of the guide bars 39 are fixed to corresponding one ends of the supports 38. The guide bars 39 are slidably supported at base ends thereof by guide rails 43 formed on a heat dissipation body 12A. Distal ends of the racks 41 are fixed to the corresponding other ends the supports 38. The racks 41 engage with pinion gears 44 of the electric motors 42 that are attached to the heat dissipation body 12A. In such configuration, rotating the electric motors 42 causes the pinion gears 44 to rotate. When the pinion gears 44 rotate, the racks 41 move linearly. When the racks 41 move, the support bars 38 attached to the racks 41 move. The heat dissipation sheets 37 can thus be deployed and stowed. Such configuration enables the heat dissipation sheets 37 to be stowed compactly (see FIG. 9(a)). A space P for mounting various components can thus be provided in the heat dissipation body 12A.

Figure 8:
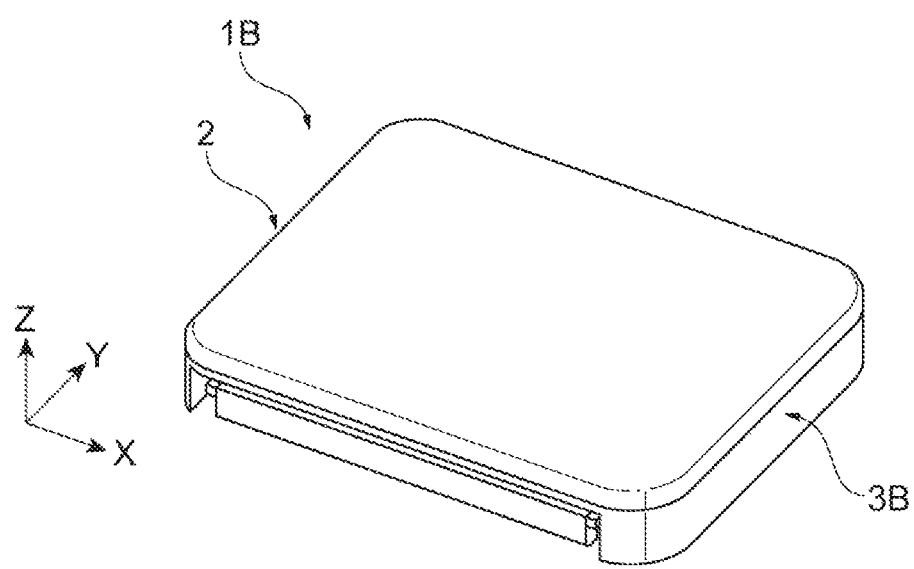
FIG. 8(*a*) is a diagram showing the stowed configuration of another variation of the coil device, and FIG. 8(*b*) is a diagram showing the heat dissipation configuration of the other variation of the coil device.
Figure 8:
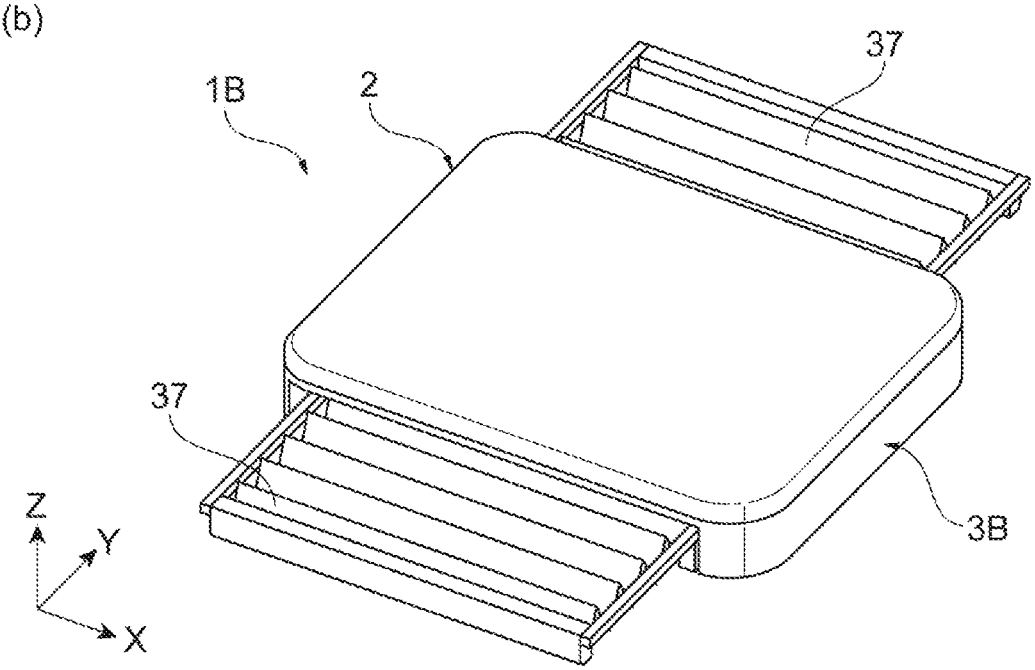
Figure 9:
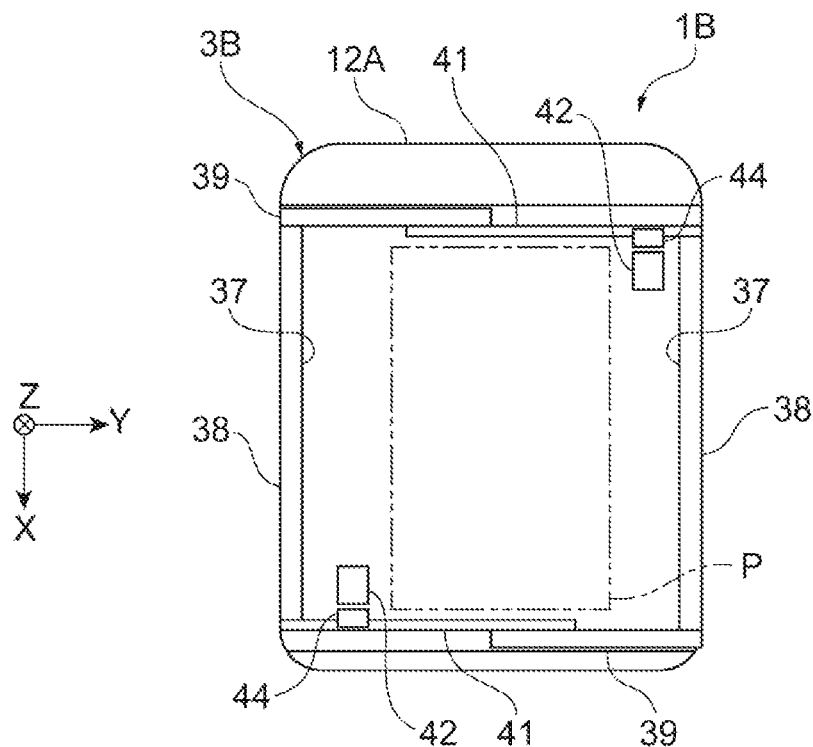
FIG. 9(*a*) is a plan view of the coil device shown in FIG. 8(*a*), and FIG. 9(*b*) is a plan view of the coil device shown in FIG. 8(*b*).
Figure 9:
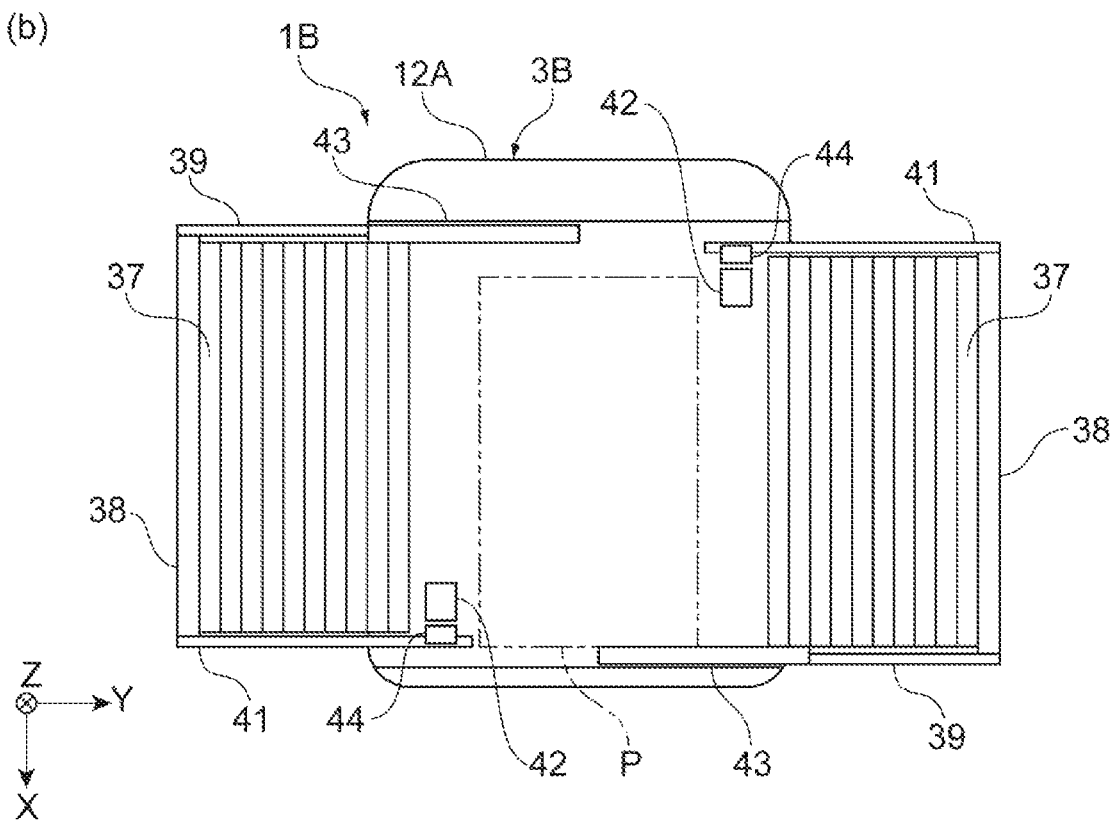
Figure 10:
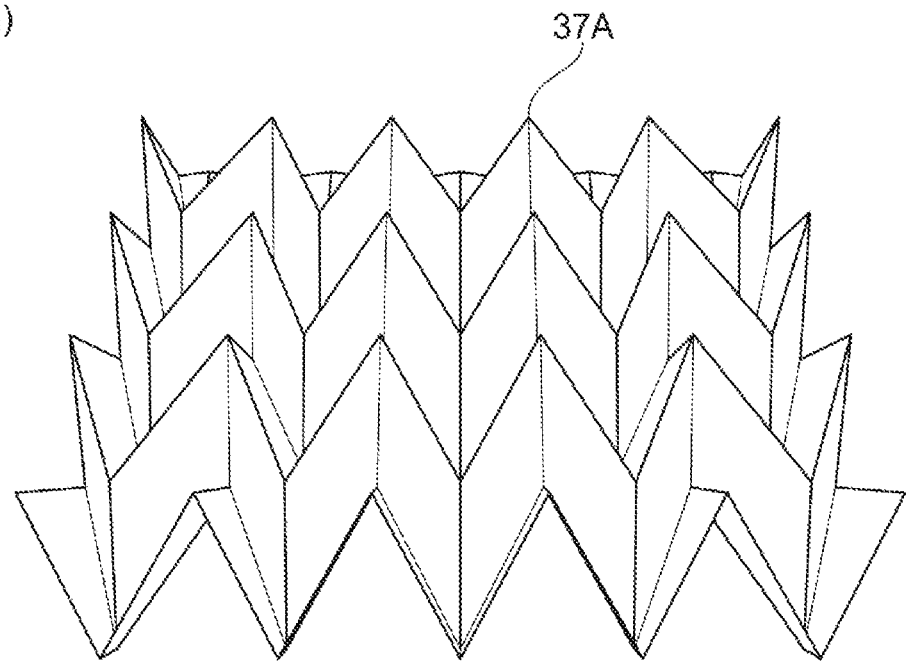
FIG. 10(*a*) is a diagram showing a heat dissipation sheet folded, and FIG. 10(*b*) is a diagram showing the heat dissipation sheet unfolded.
Figure 10:
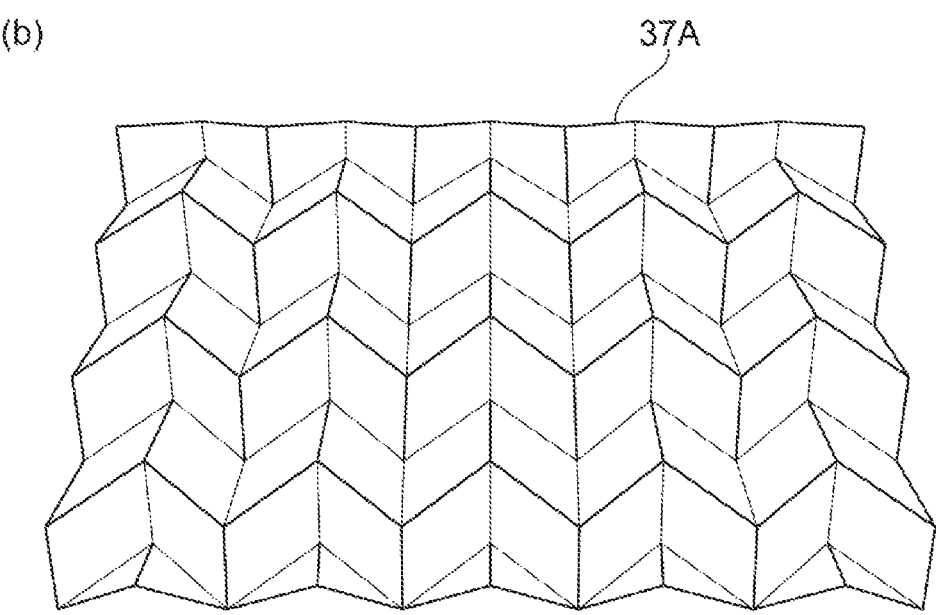

The folding configuration of the heat dissipation sheets is also not limited. Other than the folding configuration of the dissipation sheets in an accordion-like fashion as shown in FIGS. 8 and 9, a folding configuration which is referred to as the Miura fold may be employed, such as heat dissipation sheets 37A shown in FIG. 10(a) (stowed state) and FIG. 10(b) (heat dissipation state).

Figure 11:
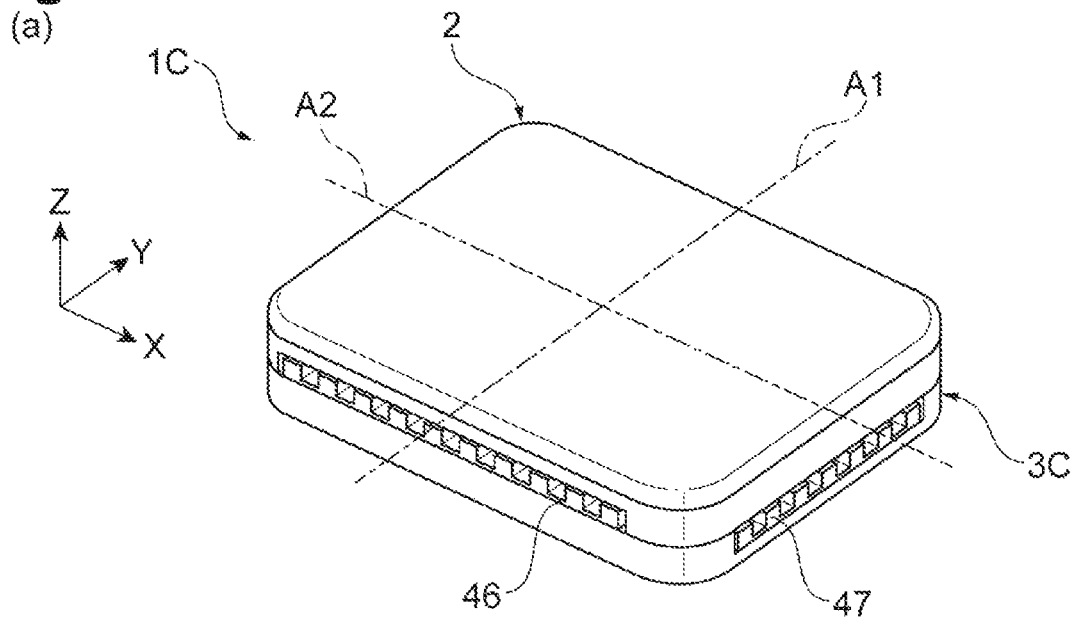
FIG. 11(*a*) is a diagram showing the stowed configuration of yet another variation of the coil device, and FIG. 11(*b*) is a diagram showing the heat dissipation configuration of the yet another variation of the coil device.
Figure 11:
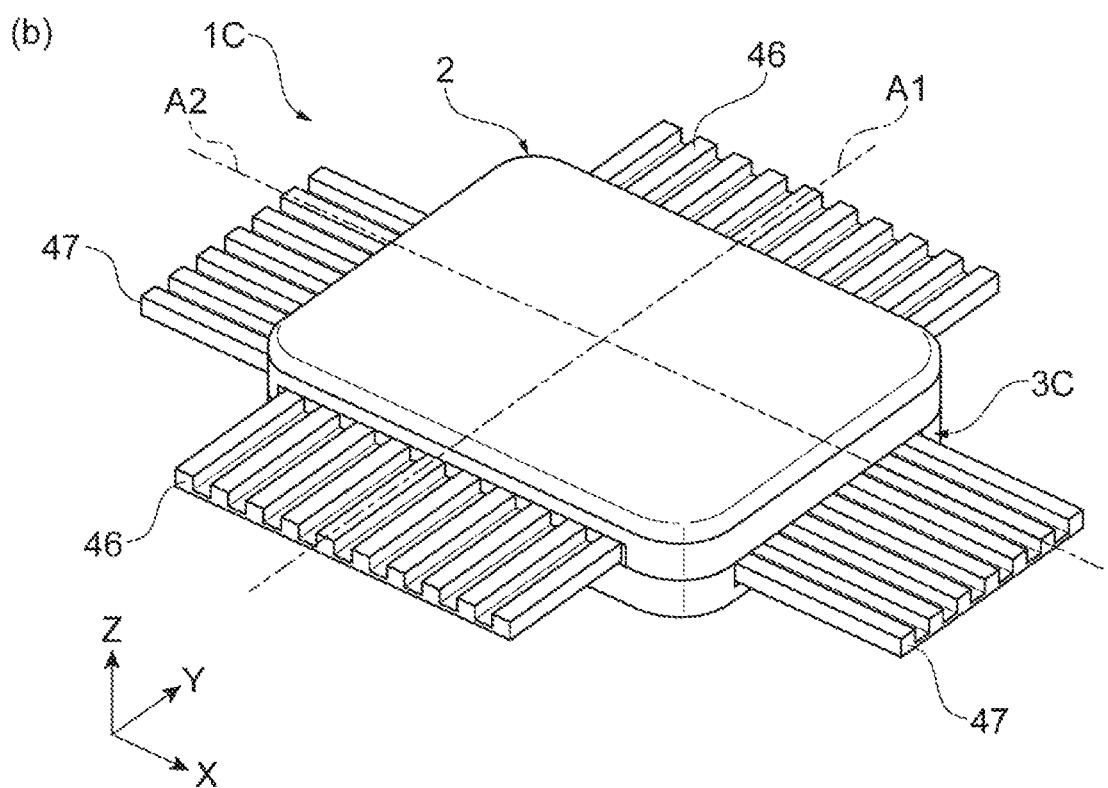

The direction in which the heat dissipation members project is not limited to one axial direction. For example, as shown in FIGS. 11(a) and 11(b), a coil device 1C includes a coil unit 2 and a heat dissipation unit 3C. In addition to a pair of first heat dissipation fins 46 which are capable of being projected in a direction of a first axis A1 (Y-axis direction), the heat dissipation unit 3C may also have second heat dissipation fins 47 which are capable of being projected in a direction of a second axis A2 (X-axis direction). The second axis A2 is perpendicular to the first axis A1. Such configuration enlarges the heat dissipation area, so that the heat dissipation efficiency is further improved.

Figure 12:
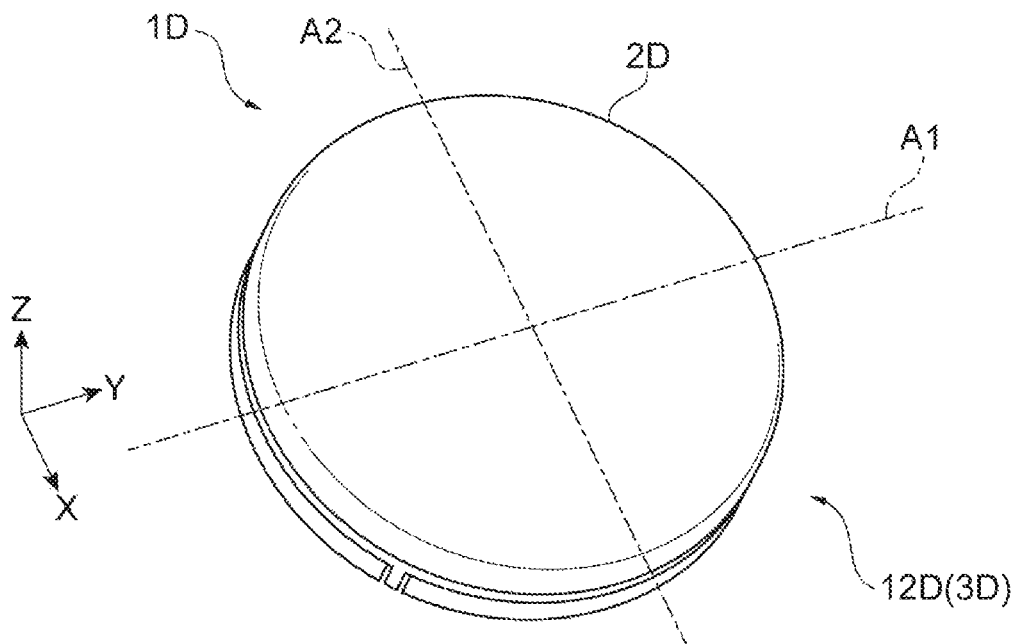
FIG. 12(*a*) is a diagram showing the stowed configuration of yet another variation of the coil device, and FIG. 12(*b*) is a diagram showing the heat dissipation configuration of the yet another variation of the coil device.
Figure 12:
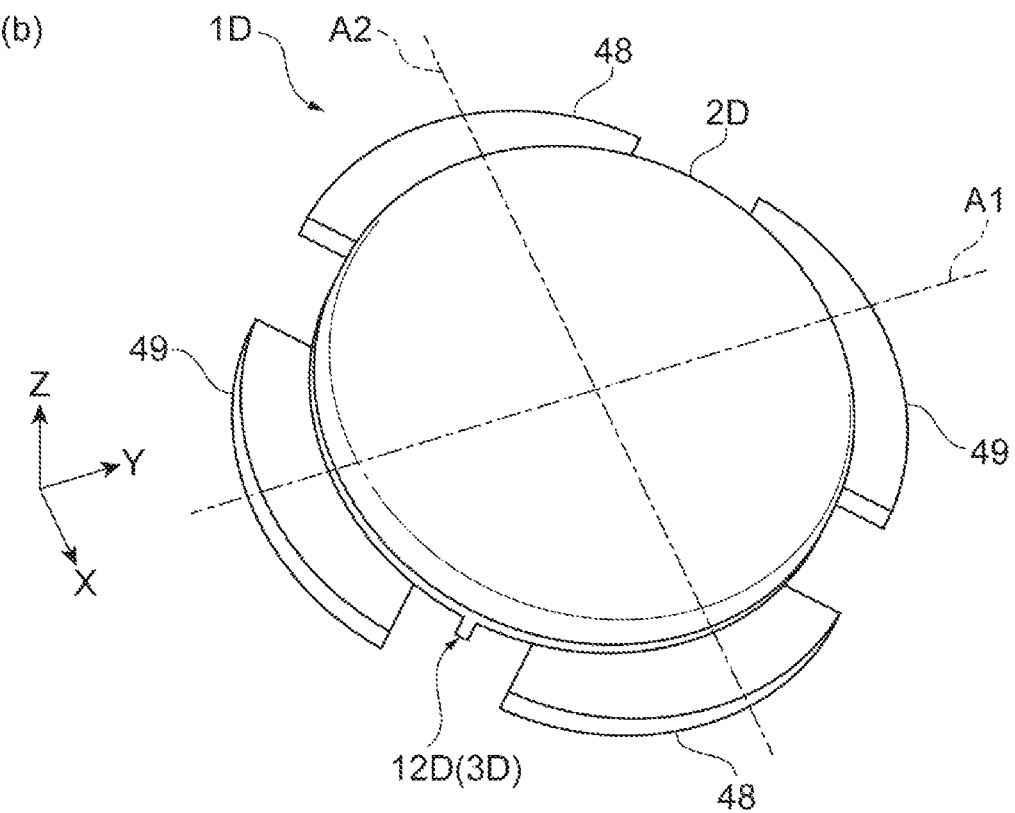

The heat dissipation body 12 is not limited to a rectangular shape in plan view. For example, as shown in FIGS. 12(a) and 12(b), a coil device 1D includes a coil unit 2D and a heat dissipation unit 3D. A heat dissipation body 12D of the heat dissipation unit 3D may have a round shape in plan view. Such configuration also enables the coil device 1D to have first heat dissipation fins 48 and second heat dissipation fins 49 that project in different directions.

Figure 13:
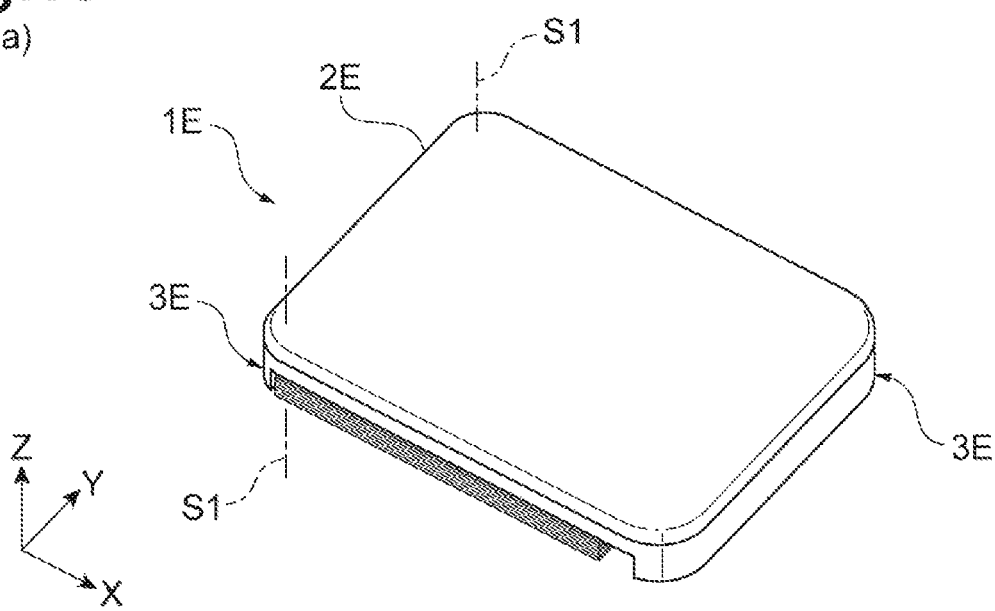
FIG. 13(*a*) is a diagram showing the stowed configuration of yet another variation of the coil device, and FIG. 13(*b*) is a diagram showing the heat dissipation configuration of the yet another variation of the coil device.
Figure 13:
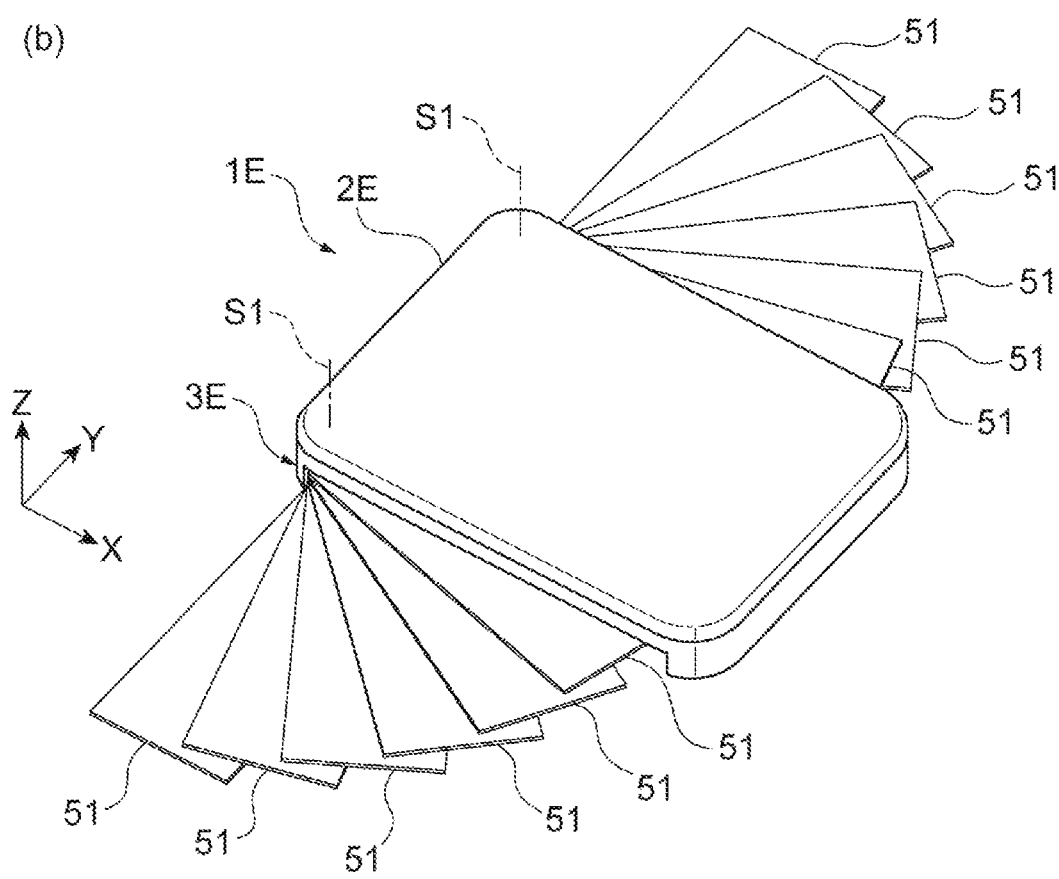

The operation of moving the heat dissipation members in and out of the heat dissipation body is not limited to the operation of linearly moving the heat dissipation members as in the coil device 1 of the first embodiment. For example, as shown in FIGS. 13(a) and 13(b), a coil device 1E includes a coil unit 2E and a heat dissipation unit 3E. The heat dissipation members of the heat dissipation unit 3E are tabular heat dissipation plates 51. The heat dissipation plates 51 rotate about drive axes S1 and fan out. The heat dissipation unit 3E of the coil device 1E has a plurality of the heat dissipation plates 51. The corners of the heat dissipation plates 51 are provided with drive shaft mechanisms (not shown). The drive shaft mechanisms drive each of the heat dissipation plates 51 to a different rotation position.

The embodiments above describe the coil device of the present disclosure applied to a wireless power transfer system. The coil device of the present disclosure is not limited to being applied to a wireless power transfer system. The coil device of the present disclosure can also be applied to a coil device that is used in an environment in which there is no paired coil device. For example, the coil device of the present disclosure may by applied to an inductive heating system and/or an eddy current flaw detection system.

INDUSTRIAL APPLICABILITY

The coil device of the present disclosure enables both efficient heat dissipation and downsizing.

REFERENCE SIGNS LIST 1, 1A, 1B, 1C, 1D, 1E Coil device
2, 2D, 2E Coil unit
2a Power transmission surface
2b Base connection surface (main surface)
3, 3A, 3B, 3C, 3D, 3E Heat dissipation unit
4 Housing (coil unit)
6 Coil (coil part)
7 Coil holding plate
8 Ferrite plate
9 Case body
11 Lid
12, 12A Heat dissipation body
12a Housing connection surface
12b Road surface connection surface
12c Fin side surface
13, 13A Heat dissipation fin (heat dissipation member)
13a Heat dissipation surface
13b Movable surface
13c Outer end surface
14 Fin drive mechanism (drive part)
15 Fin housing part
15a Fin opening
17 Worm gear
18 Electric motor
21 Wireless power transfer system
22 Power transmitter
23 Power receiver
24 Power transmission coil device
26 Power reception coil device (paired coil device)
27 Power reception circuit
28 Charging circuit
29 Battery
31 Power transmission circuit
32 Rectifier circuit
33 External power source
34 Control device
37, 37A Heat dissipation sheet (heat dissipation member)
38 Support
39 Guide bar
41 Rack
42 Electric motor
43 Guide rail
44 Pinion gear
46, 48 First heat dissipation fin
47, 49 Second heat dissipation fin
51 Heat dissipation plate
A1 First axis
A2 Second axis
B Chassis
D, DA Protrusion
G Road surface
L1, L2 Projection length
R1, R2 Region
S Winding axis
S1 Drive axis
T Tire
V Vehicle

The invention claimed is:

1. A coil device, comprising:
a coil unit having a coil part and a housing configured to accommodate the coil part that has a main surface; and
a heat dissipation unit thermally connected to the coil unit,
wherein the heat dissipation unit includes a heat dissipation body thermally connected to the main surface and having an accommodation part, a heat dissipation member configured to be movable relative to the heat dissipation body in a direction orthogonal to a winding axis of the coil part where a winding of the coil part is wound around the winding axis and thermally connected to the heat dissipation body and a driver configured to move the heat dissipation member, and
wherein the heat dissipation unit has a first configuration in which the heat dissipation member projects from the heat dissipation body in a direction along the main surface, and a second configuration in which the heat dissipation member is stowed in the accommodation part of the heat dissipation body.

2. The coil device according to claim 1, wherein when the coil part is being supplied with an electric current, the heat dissipation unit is in the first configuration.

3. The coil device according to claim 2, wherein when the heat dissipation unit is in the first configuration, a length of the heat dissipation member projecting from the heat dissipation body is a predetermined desired projection length.

4. The coil device according to claim 2, wherein the coil device supplies power to a paired coil device or receives power from the paired coil device, and
when the heat dissipation unit is in the first configuration, the length of the heat dissipation member projecting from the heat dissipation body is determined based on an amount of misalignment between the coil part of the coil device and a coil part of the paired coil device.

5. The coil device according to claim 1, wherein the coil unit further has a ferrite plate disposed between the coil part and the housing.

6. The coil device according to claim 1, wherein the heat dissipation member has a pair of heat dissipation fins,
the heat dissipation body has a housing connection surface in contact with the main surface of the housing, a road connection surface opposite to the housing connection surface and a pair of side surfaces, and
each of the pair of heat dissipation fins protrude from a respective surface of the pair of side surfaces when in the first mode.

7. The coil device according to claim 6, wherein the pair of heat dissipation fins are switched reciprocally between the first configuration and the second configuration by the driver.

8. The coil device according to claim 6, wherein a first heat dissipation fin of the pair of heat dissipation fins is switched reciprocally between the first configuration and the second configuration by a first portion of the driver, and a second heat dissipation fin of the pair of heat dissipation fins is switched reciprocally between the first configuration and the second configuration by a second portion of the driver differing from the first portion of the driver.

9. The coil device according to claim 1, wherein the pair of heat dissipation fins have an uneven structure extending along a movement direction for switching reciprocally between the first configuration and the second configuration.

10. The coil device according to claim 1, wherein the pair of heat dissipation fins have an uneven structure extending along a direction orthogonal to a movement direction for switching reciprocally between the first configuration and the second configuration.

11. The coil device according to claim 1, wherein the heat dissipation member has a pair of first heat dissipation members configured to move along a first direction orthogonal to the winding axis of the coil part and a pair of second heat dissipation members configured to move along a second direction orthogonal to the first direction.

* * * * *